United States Patent
Zhang

(10) Patent No.: US 7,970,050 B2
(45) Date of Patent: *Jun. 28, 2011

(54) METHOD AND APPARATUS FOR ENCODING AND DECODING DATA IN INTRA MODE BASED ON MULTIPLE SCANNING

(75) Inventor: Zhi-ming Zhang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1733 days.

This patent is subject to a terminal disclaimer.

(21) Appl. No.: 11/191,931

(22) Filed: Jul. 29, 2005

(65) Prior Publication Data

US 2006/0067399 A1    Mar. 30, 2006

(30) Foreign Application Priority Data

Sep. 30, 2004   (KR) .................. 10-2004-0077723

(51) Int. Cl.
*H04N 7/12*      (2006.01)
*G06K 9/36*      (2006.01)
(52) U.S. Cl. .................. 375/240.03; 382/233
(58) Field of Classification Search ............ 375/240.03, 375/240.12, 240.13, 240.16; 382/233
See application file for complete search history.

(56) References Cited

U.S. PATENT DOCUMENTS

| | | | | |
|---|---|---|---|---|
| 6,426,975 | B1 * | 7/2002 | Nishi et al. | 375/240.13 |
| 7,711,196 | B2 * | 5/2010 | Kim et al. | 382/233 |
| 2003/0202588 | A1 | 10/2003 | Yu et al. | |
| 2004/0001546 | A1 | 1/2004 | Tourapis et al. | |
| 2004/0057523 | A1 | 3/2004 | Koto et al. | |
| 2005/0036549 | A1 * | 2/2005 | He et al. | 375/240.12 |
| 2006/0067400 | A1 * | 3/2006 | Zhang | 375/240.03 |

FOREIGN PATENT DOCUMENTS

| | | |
|---|---|---|
| EP | 1 120 976 | 8/2001 |
| EP | 1 241 893 | 3/2002 |
| EP | 1 349 396 | 10/2003 |

\* cited by examiner

*Primary Examiner* — Gims S Philippe
(74) *Attorney, Agent, or Firm* — Staas & Halsey LLP

(57) ABSTRACT

Provided are a method and apparatus for encoding and decoding in an intra mode based on a multiple scanning method through which efficiency of the intra mode is improved by using a spatial relationship within a frame more and obtaining estimation information from numerous references. The method includes: dividing an input image into basic encoding units composed of predetermined sized blocks; scanning at least one of the basic encoding units; determining whether references for motion estimation of a current basic encoding unit can be used as references to encode the current basic encoding unit; and encoding the current basic encoding unit according to a result of the determination.

30 Claims, 13 Drawing Sheets

ENCODED/DECODED BLOCKS AT 1st SCAN

ENCODED/DECODED BLOCKS AT 2nd SCAN

ENCODED/DECODED BLOCKS AT Nth SCAN

METHOD AND APPARATUS FOR ENCODING AND DECODING DATA IN INTRA MODE BASED ON MULTIPLE SCANNING

CROSS-REFERENCE TO RELATED APPLICATION

This application claims the benefit of Korean Patent Application No. 10-2004-0077723, filed on Sep. 30, 2004 in the Korean Intellectual Property Office, the disclosure of which are incorporated herein in its entirety by reference.

BACKGROUND OF THE INVENTION

1. Field of the Invention

The present invention relates to a method and apparatus for encoding and decoding data in an intra mode, and more particularly, to a method and apparatus for encoding and decoding data in an intra mode based on a multiple scanning method in which an encoding and decoding order is set according to whether a motion estimation reference can be used as a reference for encoding/decoding the data.

2. Description of the Related Art

Recently, codecs of Moving Picture Experts Group (MPEG)-2, MPEG-4, and H.263 use a discrete cosine transform (DCT) of itself as their reference in an intra mode. In the intra mode of H.264, a top macroblock and/or a left macroblock are/is used as its reference.

Referring to FIG. 1, it can be seen that an encoding/decoding order in MPEG-2, MPEG-4, H.263, and H.264 is from left to right, and from top to bottom.

FIG. 2 is a view of an encoding/decoding order in an intra mode of MPEG-2, MPEG-4, and H.263.

First, the encoding order of MPEG-2, MPEG-4, and H.263 is as follows:

(1) An 8×8 block A is obtained. (2) DCT is performed: DCT(A) (3) Quantization is performed: Matrix B=Quantization (DCT(A)) (4) Coefficients of the matrix B (i.e., DCT coefficients) are zigzag scanned, and encoding is performed in an order in which VLC encoding is performed.

The decoding order of MPEG-2, MPEG-4, and H.263 is as follows:

(1) Matrix A is obtained by VLC decoding and zigzag scanning. (2) Dequantization is performed: B=Dequantization(A) (3) Inverse DCT (IDCT) is performed: IDCT(B) (4) Decoding is performed in an order in which the decoded 8×8 block is obtained.

As seen in the encoding and decoding method described above, the coefficients of the matrix B just depend on its 8×8 block frequency coefficients, and are encoded and decoded independently.

FIG. 3 is a view of an encoding/decoding order in an intra mode of H.264.

In H.264, the intra mode is based on DCT conversion of the difference of a 4×4 (or 16×16) block and motion estimation of itself.

First, the encoding order of H.264 is as follows:

(1) A 4×4 (16×16) block matrix A is obtained. (2) Top/left pixels are obtained. (3) An estimation matrix C is obtained from the top/left pixels according to an estimation mode. (4) A difference of A and C is DCT converted: DCT(A-C) (5) Quantization is performed: B=Quantization (DCT(A-C)) (6) Matrix B is zigzag scanned, and VLC encoding is performed.

The decoding order of H.264 is as follows: (1) Matrix A (4×4 or 16×16) is obtained by VLC decoding and zigzag scanning. (2) Dequantization is performed: B=Dequantization(A) (3) IDCT is performed: IDCT(B) (4) Top/left pixels are obtained. (5) An estimation matrix C is obtained from the top/left pixels according to an estimation mode. (6) A decoded block is obtained by adding a result of the IDCT and the matrix C: IDCT(B)+C.

As described above, the coefficients of the matrix B not only depend on the present block but also on its neighbor pixels. In addition, motion estimation of this type can improve the efficiency of a codec. A mode for an encoding and decoding unit is limited in a conventional technology.

That is, in the case of the intra mode of MPEG-2, MPEG-4, and H.263, only frequency coefficients are encoded and the efficiency of a codec is not higher than that of H.264 since the spatial relationship is not used.

In the case of the intra mode of H.264, blocks are encoded from left to right and from top to bottom, the current block can obtain estimation information only from itself or encoded top and left pixels. Thus, its spatial relationship becomes very limited.

Therefore, if a macroblock has an error (caused by an encoder or transmission) therein, a left macroblock in a frame or a slice as described above is also lost and a low peak signal-to-noise ratio occurs.

SUMMARY OF THE INVENTION

Additional aspects and/or advantages of the invention will be set forth in part in the description which follows and, in part, will be apparent from the description, or may be learned by practice of the invention.

The present invention provides a method of encoding and decoding in an intra mode based on a multiple scanning method to improve the efficiency of the intra mode by using a spatial relationship within a frame and obtaining estimation information from numerous references.

According to an aspect of the present invention, there is provided a method of encoding in an intra mode based on a multiple scanning method. The method includes: dividing an input image into basic encoding units composed of predetermined sized blocks; scanning at least one of the basic encoding units; determining whether references for motion estimation of a current basic encoding unit can be used as references to encode the current basic encoding unit; and selectively encoding the current basic encoding unit according to a result of the determination.

From the scanning of the at least one of the basic encoding units to the selective encoding of the current basic encoding unit are repeated until encoding of the input image is completed.

The selective encoding of the current basic encoding unit includes: encoding the current basic encoding unit based on the references if the references for motion estimation can be used as the references to encode the current basic encoding unit, and not encoding the current basic encoding unit and moving on to a next basic encoding unit that is to be encoded if the references for motion estimation cannot be used as the references to encode the current basic encoding unit.

The encoding of the current basic encoding unit based on the references includes: obtaining an estimation matrix from the references for motion estimation; performing a discrete cosine transform (DCT) on a difference between the current encoding unit that is to be encoded and the obtained estimation matrix; obtaining DCT coefficients by performing dequantization; and encoding the current basic encoding unit using the DCT conversion coefficients.

The DCT conversion coefficients are scanned in a zigzag pattern and encoded using a variable length coding (VLC)

method. Some blocks among previously decoded blocks are used as the references for motion estimation.

Also, the references for motion estimation are an arbitrary combination of top, bottom, left, and/or right pixels of the basic encoding units, or any M×N matrixes that are neighboring the basic encoding units. The basic encoding units composed of the predetermined sized blocks are macroblocks or M×N matrixes.

According to another aspect of the present invention, there is provided a method of decoding in an intra mode based on a multiple scanning method. The method includes: dividing an input image into basic decoding units composed of predetermined sized blocks; scanning at least one of the basic decoding units; determining whether references for motion estimation of a current basic decoding unit can be used as references to encode the current basic decoding unit; and selectively decoding the current basic decoding unit according to a result of the determination.

From the scanning of the at least one of the basic decoding units to the selective decoding of the current basic decoding unit are repeated until decoding of the input image is completed.

The selective decoding of the current basic decoding unit includes: decoding the current basic decoding unit based on the references if the references for motion estimation can be used as the references to decode the current basic decoding unit, and not decoding the current basic decoding unit and moving on to a next basic decoding unit that is to be decoded if the references for motion estimation cannot be used as the references to decode the current basic decoding unit.

The decoding of the current basic decoding unit based on the references includes: obtaining the basic decoding units through decoding and scanning the input image; dequantizing the obtained basic decoding units; obtaining references for motion estimation by performing inverse DCT (IDCT) on a result of the dequantization; obtaining an estimation matrix from the obtained references for motion estimation; and adding the result of the IDCT and the estimation matrix to obtain a decoded block.

The basic decoding units are decoded using a VLC method and obtained using zigzag scanning in the obtaining of the basic decoding units. Some blocks among previously decoded blocks are used as the references for motion estimation.

The references for motion estimation are a combination of top, bottom, left, and/or right pixels of the basic decoding units, or are any M×N matrixes that are neighboring the basic decoding units. The basic decoding units composed of the predetermined sized blocks are macroblocks or M×N matrixes.

According to another aspect of the present invention, there is provided an encoder in an intra mode based on a multiple scanning method. The encoder includes: a scanning unit for dividing an input image into basic encoding units composed of predetermined sized blocks and scanning at least one of the basic encoding units; an encoding determination unit for determining whether references for motion estimation of the basic encoding units scanned by the scanning unit can be used as references to encode the basic encoding units; an encoding unit for selectively encoding the basic encoding units according to a result of the determination of the encoding determination unit; and a controlling unit for controlling operations of the scanning unit, the encoding determination unit, and the encoding unit.

The encoding unit includes: an estimation matrix generating unit to obtain an estimation matrix from the references for motion estimation; a difference calculating unit to calculate a difference between a basic encoding unit selected by the encoding determination unit and the estimation matrix obtained from the estimation matrix generating unit; a DCT unit to perform DCT on an output of the difference calculating unit; a quantization unit to quantize a result output from the DCT unit; and a VLC encoding unit to scan and perform VLC encoding on a result of quantization.

The controlling unit operates the scanning unit, the encoding determination unit, and the encoding unit until encoding of the input image is completed.

Some blocks among previously decoded blocks are used as the references for motion estimation.

The references for motion estimation are an arbitrary combination of top, bottom, left, and/or right pixels of the basic encoding units, or are any M×N matrixes that are neighboring the basic encoding units. The basic encoding units composed of the predetermined sized blocks are macroblocks or M×N matrixes.

According to another aspect of the present invention, there is provided a decoder in an intra mode based on a multiple scanning method. The decoder includes: a scanning unit for dividing an input image into basic decoding units composed of predetermined sized blocks and scanning at least one of the basic decoding units; a decoding determination unit for determining whether references for motion estimation of the basic decoding units scanned by the scanning unit can be used as references to decode the basic decoding units; a decoding unit for selectively decoding the basic decoding units according to a result of the determination of the decoding determination unit; and a controlling unit for controlling operations of the scanning unit, the decoding determination unit, and the decoding unit.

The decoding unit includes: a VLC decoding unit to obtain the basic decoding units through VLC decoding and scanning the input image; a dequantinizer to dequantize the obtained basic decoding units; an IDCT unit to perform IDCT to obtain the references for motion estimation; an estimation matrix generating unit to obtain an estimation matrix from the references for motion estimation; and an adder to add an output of the IDCT unit and the estimation matrix.

The controlling unit operates the scanning unit, the decoding determination unit, and the decoding unit until decoding of the input image is completed. Some blocks among previously decoded blocks are used as the references for motion estimation.

The references for motion estimation are a combination of top, bottom, left, and/or right pixels of the basic decoding units, or are any M×N matrixes that are neighboring the basic decoding units.

The basic decoding units composed of the predetermined sized blocks are macroblocks or M×N matrixes.

BRIEF DESCRIPTION OF THE DRAWINGS

These and/or other features and advantages of the present invention will become more apparent by describing in detail exemplary embodiments thereof with reference to the attached drawings in which.

According to an aspect, a computer readable recording medium having a program recorded thereon for executing a method of encoding in an intra mode based on a multiple scanning method, the method including: dividing an input image into basic encoding units composed of predetermined sized blocks; scanning at least one of the basic encoding units; determining whether references for motion estimation of a current basic encoding unit can be used as references to encode the current basic encoding unit; and encoding the current basic encoding unit according to a result of the determination.

DETAILED DESCRIPTION OF THE PREFERRED EMBODIMENTS

Figure 1:
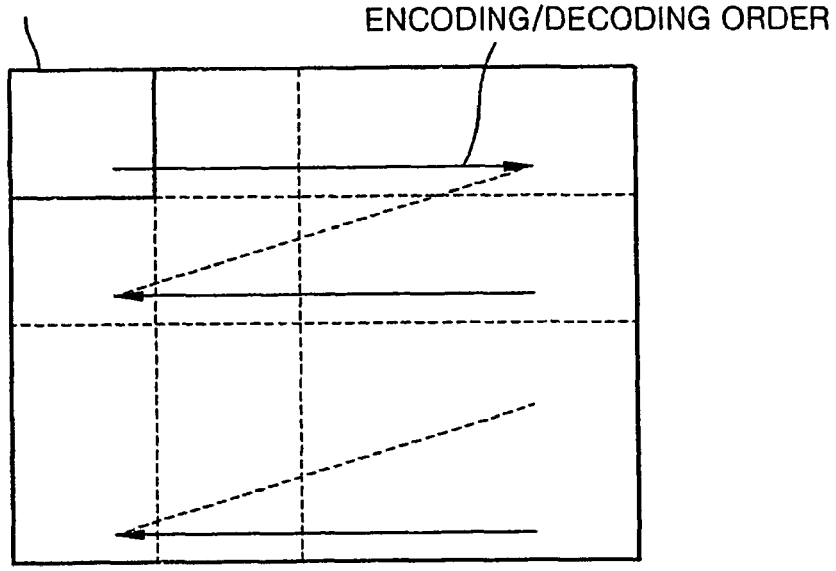
FIG. 1 is a view illustrating an encoding/decoding order of Moving Picture Experts Group (MPEG)-2, MPEG-4, H.263, and H.264.
Figure 2:
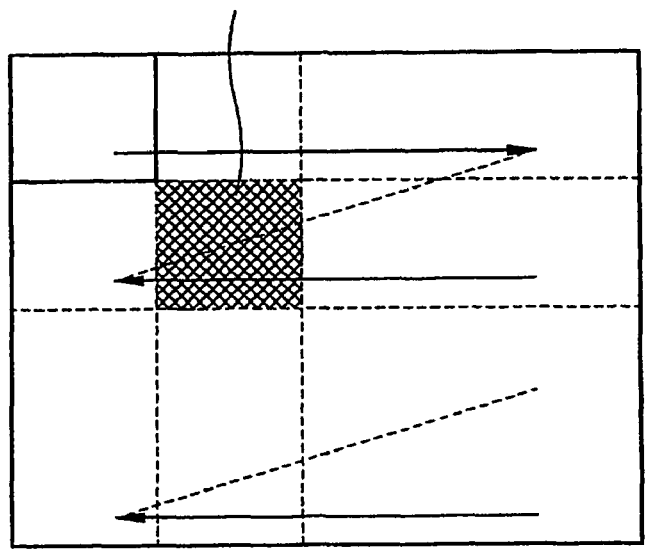
FIG. 2 is a view illustrating an encoding/decoding order in an intra mode of MPEG-2, MPEG-4, and H.263.
Figure 3:
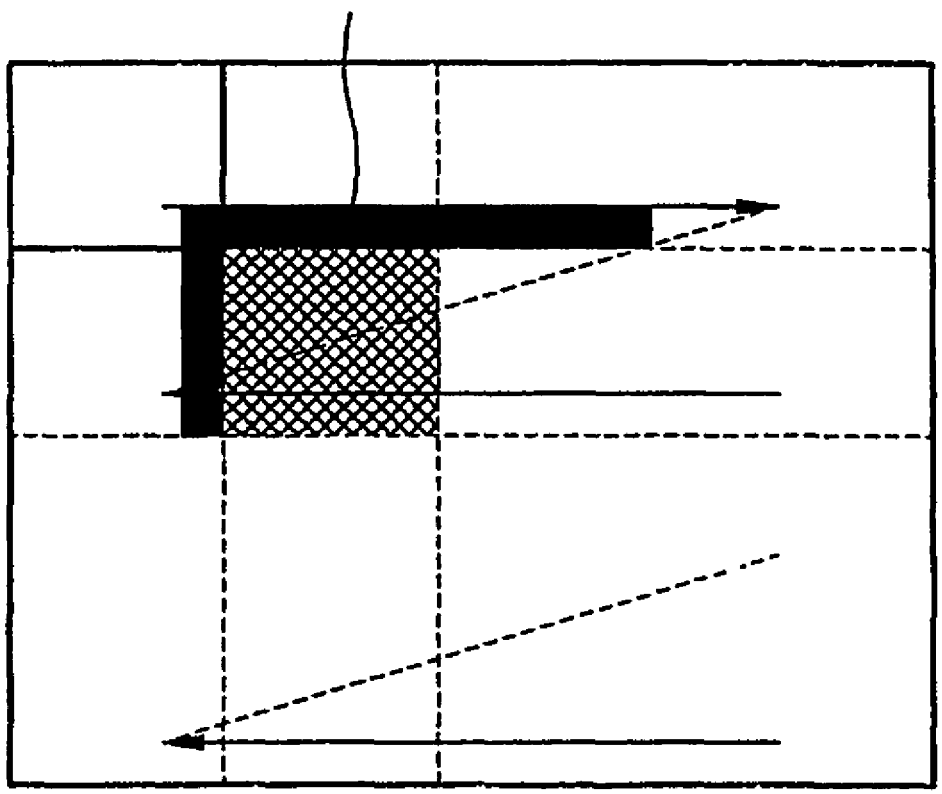
FIG. 3 is a view illustrating an encoding/decoding order in an intra mode of H.264.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention will now be described more fully with reference to the accompanying drawings, in which exemplary embodiments of the invention are shown.

Figure 4:
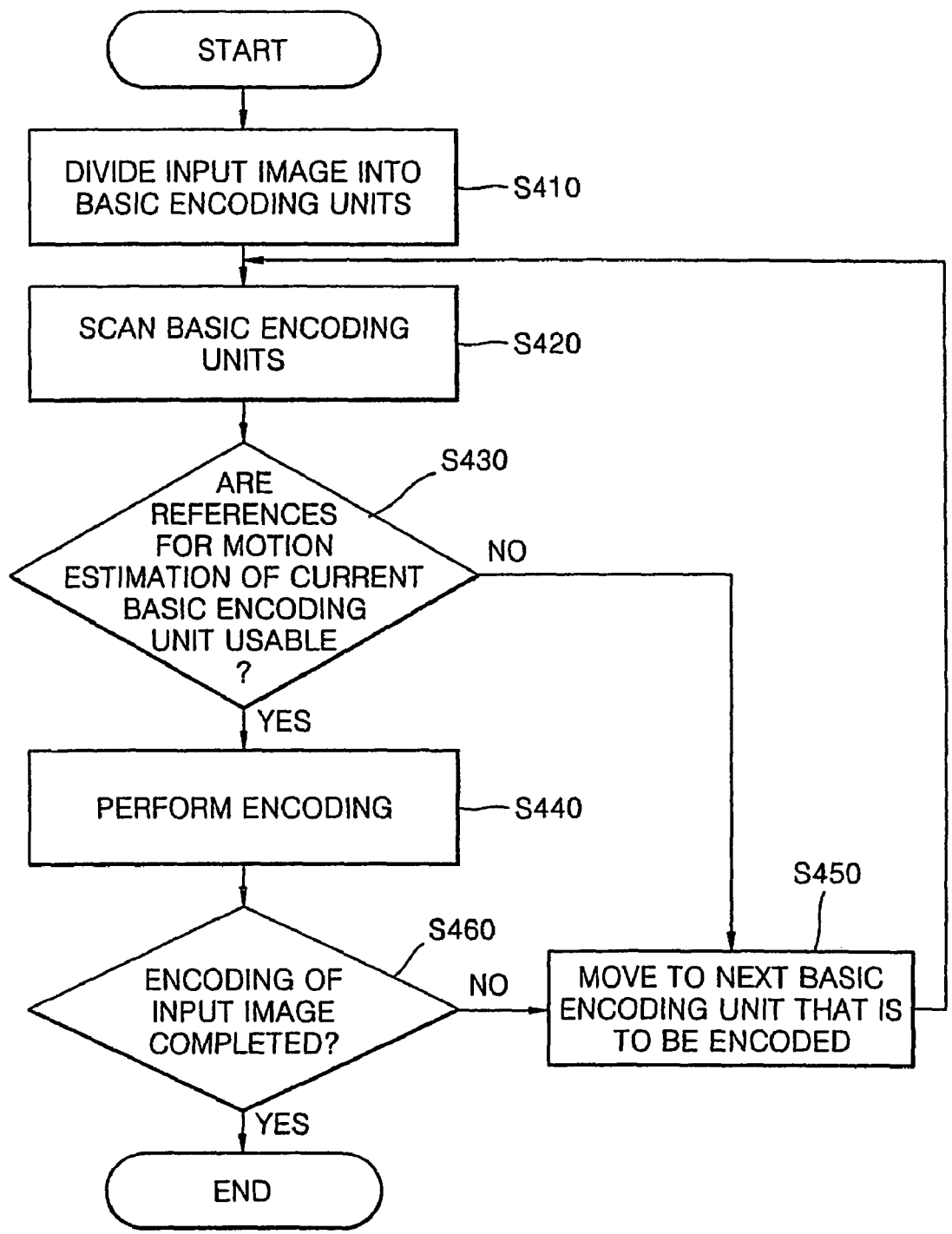
FIG. 4 is a flow chart illustrating an encoding order in an intra mode based on a multiple scanning method according to an embodiment of the present invention.

Referring to FIG. 4, an encoding order in an intra mode based on a multiple scanning method according to an embodiment of the present invention will be described.

First, an input image is divided into basic encoding units composed of predetermined sized blocks (S410). Here, the basic encoding units composed of the predetermined sized blocks may be 16×16 macroblocks (MBs) or M×N MBs form (M>1, N>1, wherein M and N are integers).

Next, at least one of the basic encoding units is scanned (S420). In the present embodiment, raster scanning, which is a general scanning method, is adopted. Raster scanning scans from left to right, and from top to bottom.

Then, it is determined whether references for motion estimation of the current basic encoding unit can be used for references to encode the current basic encoding unit (S430). The references for motion estimation use blocks among previously decoded blocks. The references for motion estimation will be described in more detail later with reference to FIG. 14.

In operation S430, if the result of the determination indicates that the references for motion estimation of the current basic encoding unit can be used as the references to encode the current basic encoding unit, encoding is performed (S440).

If the references for motion estimation of the current basic encoding unit cannot be used as the references to encode the current basic encoding unit, encoding is not performed on the current basic encoding unit and the process moves on to the next basic encoding unit (S450). Then, the process moves on to operation S420 which scans the basic encoding units. The encoding process of operation S440 will be described in more detail with reference to FIG. 5. After performing encoding in operation S440, it is determined whether encoding of the input image is completed (S460). If the determination result indicates that the encoding of the input image is completed, the encoding process is terminated, but if the encoding of the input image is not completed, the process moves on to operation S450 and then starts the process from operation S420.

Figure 5:
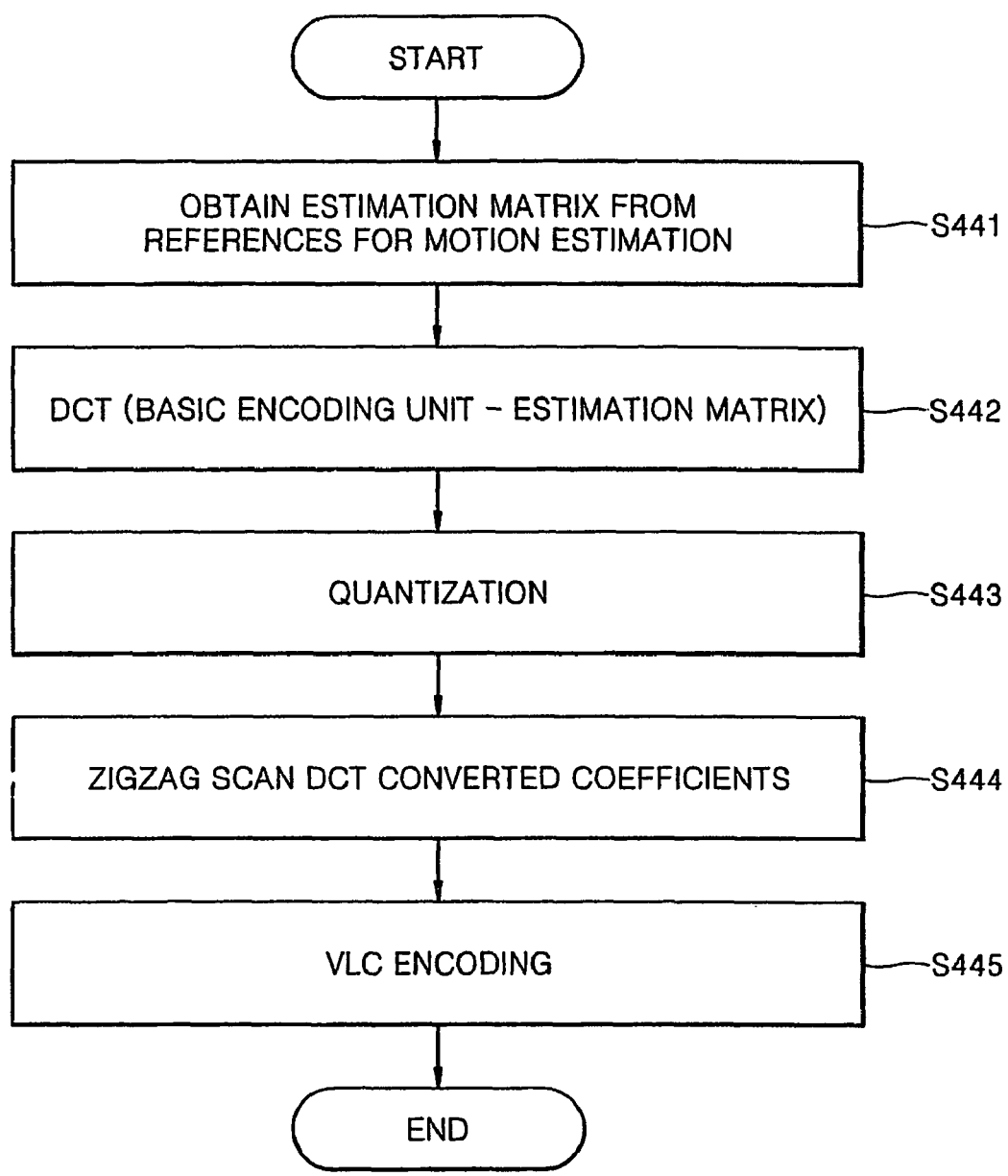
FIG. 5 is a detailed flow chart illustrating an encoding operation described in FIG. 4.

FIG. 5 is a detailed flow chart illustrating the encoding operation (S440) described in FIG. 4.

An estimation matrix is obtained from the references for motion estimation that can be used as the references for encoding the basic encoding units (S441).

Then, after calculating the differences between the basic encoding units and the estimation matrix, the difference values are discrete cosine transform (DCT) converted (S442).

DCT coefficients are obtained by quantizing the DCT coefficients results in operation S442 (S443).

After zigzag scanning the obtained DCT quantization coefficients (S444), variable length coding (VLC) is performed (S445).

Figure 6:
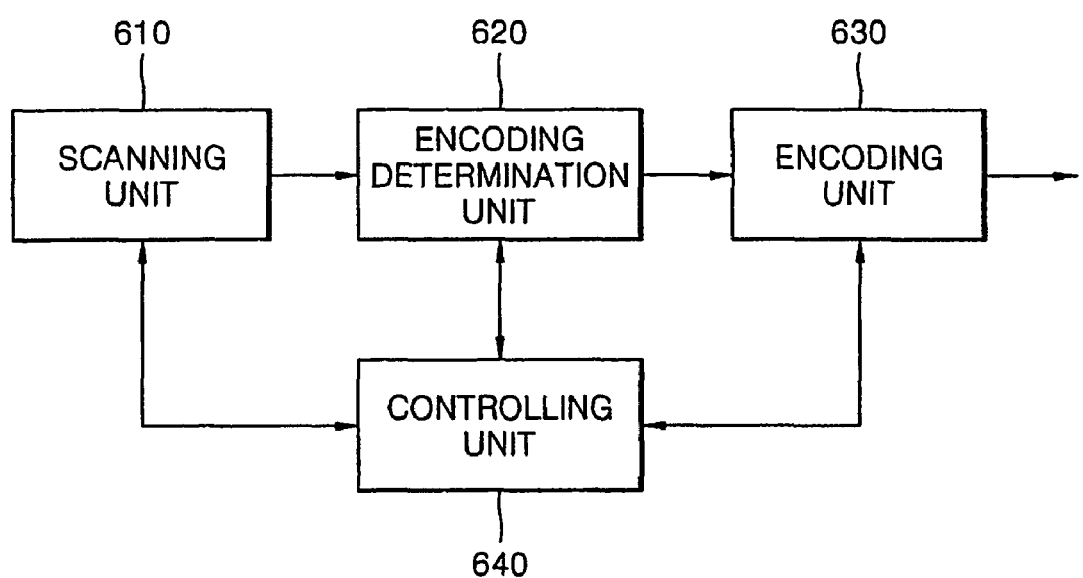
FIG. 6 is a schematic diagram of an encoder to perform encoding in the intra mode based on the multiple scanning method according to an embodiment of the present invention.

FIG. 6 is a schematic diagram of an encoder to perform encoding in the intra mode based on the multiple scanning method according to an embodiment of the present invention.

The encoder illustrated in FIG. 6 includes a scanning unit 610, an encoding determination unit 620, an encoding unit 630, and a controlling unit 640. The scanning unit 610 divides an input image into basic encoding units composed of predetermined sized blocks and scans at least one basic encoding unit.

The encoding determination unit 620 determines whether references for motion estimation of the basic encoding units scanned by the scanning unit 620 can be used as references to encode the basic encoding units.

The encoding unit 630 selectively encodes the basic encoding units according to the determination result of the encoding determination unit 620, and the controlling unit 640 controls the operations of the scanning unit 610, the encoding determination unit 620, and the encoding unit 630.

Also, the controlling unit 640 operates the scanning unit 610, the encoding determination unit 620, and the encoding unit 630 until encoding of the input image is completed.

Figure 7:
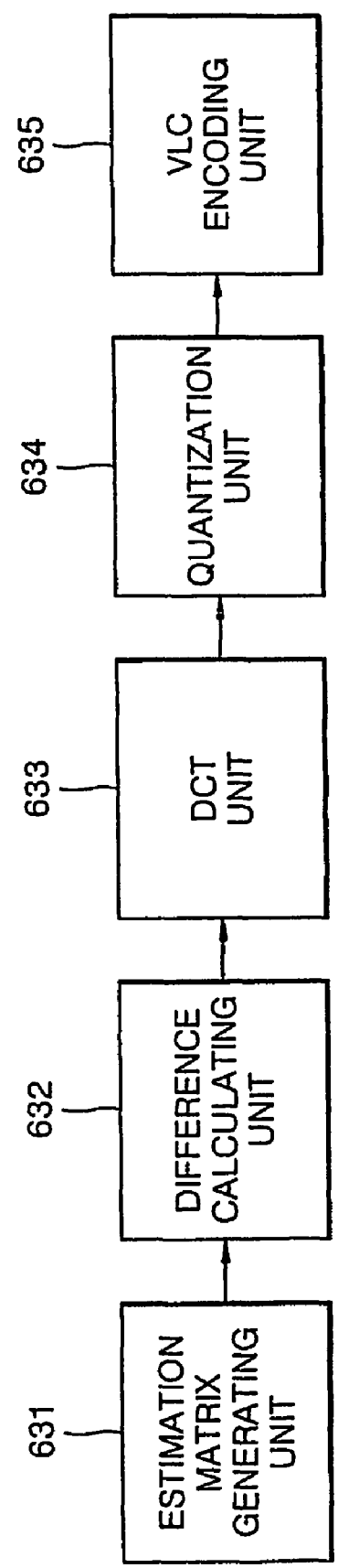
FIG. 7 is a schematic diagram of an encoding unit illustrated in FIG. 6.

Referring to FIG. 7, a schematic structure of the encoding unit 630 illustrated in FIG. 6 is as follows.

The encoding unit 630 includes an estimation matrix generating unit 631, a difference calculating unit 632, a DCT unit 633, a quantizing unit 634, and a VLC encoding unit 635.

The estimation matrix generating unit 631 obtains an estimation matrix from references for motion estimation.

The difference calculating unit 632 calculates the difference between a basic encoding unit selected by the encoding determination unit 620 and the estimation matrix obtained by the estimation matrix generating unit 631. The DCT unit 633 performs DCT on the output of the difference calculating unit 632.

The quantizing unit 634 quantizes the result output from the DCT unit 633, and the VLC encoding unit 635 scans the quantized result and performs VLC encoding.

Figure 8:
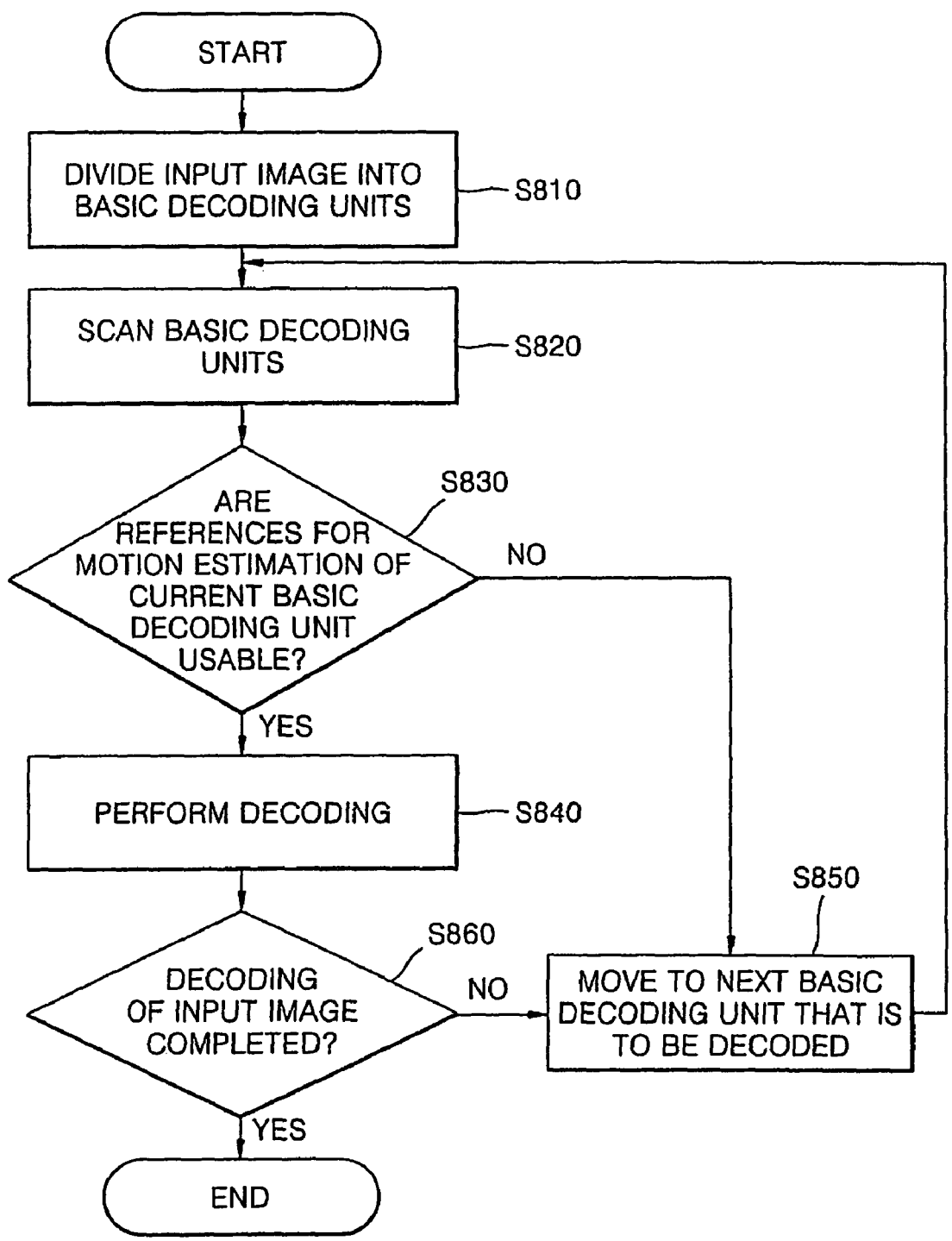
FIG. 8 is a flow chart illustrating a decoding order in the intra mode based on the multiple scanning method according to an embodiment of the present invention.

FIG. 8 is a flow chart illustrating a decoding order in the intra mode based on the multiple scanning method according to an embodiment of the present invention.

First, an input image is divided into basic decoding units composed of predetermined sized blocks (S810). Here, the basic decoding units composed of the predetermined sized blocks may be 16×16 MBs or M×N MBs form (M>1, N>1, wherein M and N are integers).

Then, at least one of the basic decoding units is scanned (S820). In the present embodiment, raster scanning, which is a general scanning method, is adopted. Raster scanning scans from left to right, and from top to bottom.

Then, it is determined whether references for motion estimation of the current basic decoding unit can be used for a reference to decode the current basic decoding unit (S830). Blocks among previously decoded blocks can be used for the reference for motion estimation. The references for motion estimation will be described in more detail later with reference to FIG. 14.

In operation S830, if the result of the determination indicates that the references for motion estimation of the current basic decoding unit can be used as the reference to decode the current basic decoding unit, decoding is performed (S840).

If the references for motion estimation of the current basic decoding unit cannot be used as the reference to decode the current basic decoding unit, decoding is not performed on the current basic decoding unit and the process moves on to the next basic decoding unit (S850). Then, the process moves on to operation S820 which scans the basic decoding units. The decoding process of operation S840 will be described in more detail with reference to FIG. 9.

After performing decoding in operation S840, it is determined whether decoding of the input image is completed (S860).

If the determination result indicates that the decoding of the input image is completed, the decoding process is terminated, but if the decoding of the input image is not completed, the process moves on to operation S850 and then starts the process from operation S820.

Figure 9:
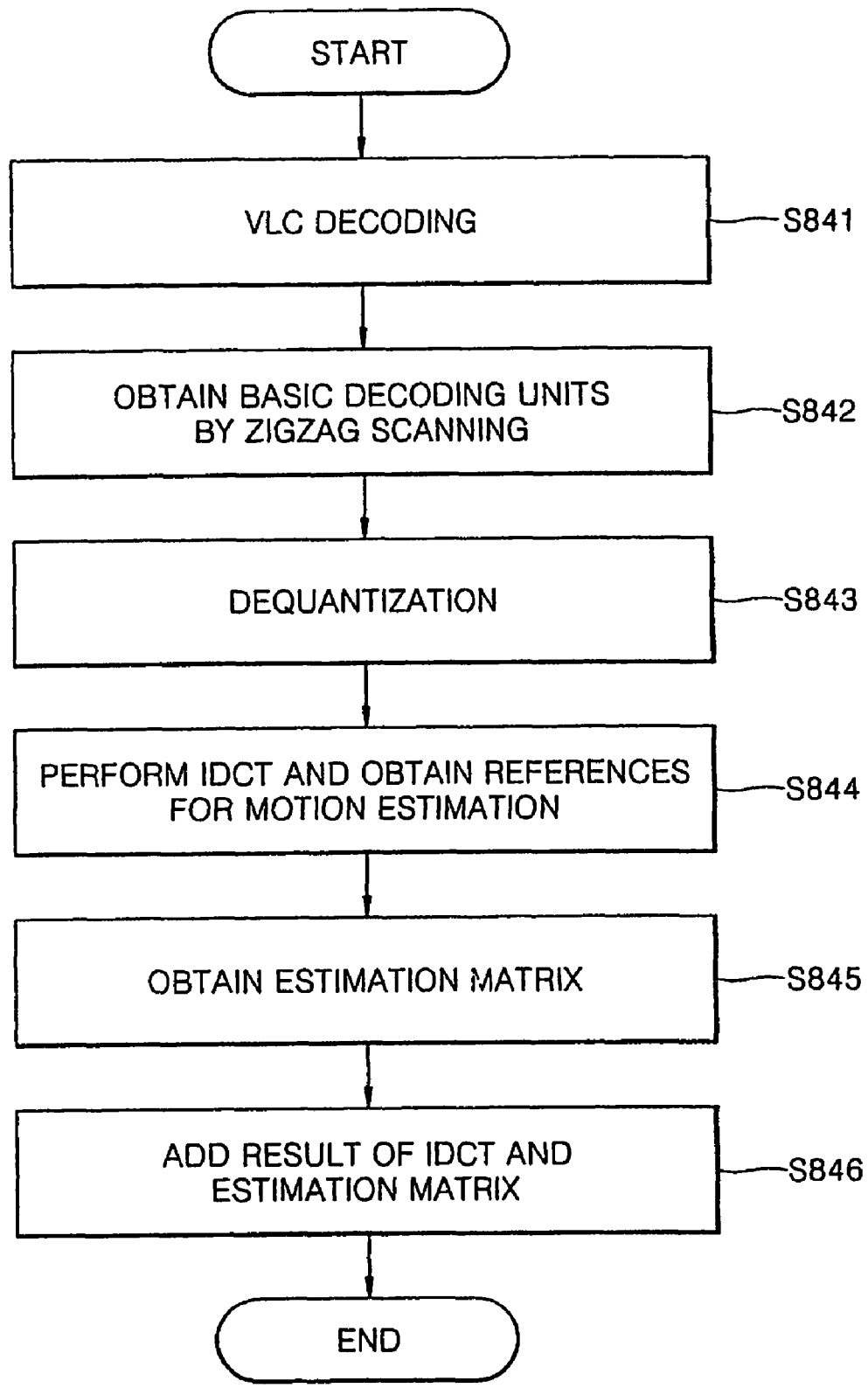
FIG. 9 is a detailed flow chart illustrating a decoding operation described in FIG. 8.

FIG. 9 is a detailed flow chart illustrating the decoding operation (S840) described in FIG. 8.

After performing VLC decoding (S841) the basic decoding units are obtained by zigzag scanning (S842). Then, the obtained basic decoding units are dequantized (S843). Inverse DCT (IDCT) is performed on the result of dequantization to obtain the reference for motion estimation (S844). Through operation S844, an estimation matrix is obtained from the reference for motion estimation (S845). Then, the result of IDCT and the estimation matrix are added together (S846). As a result, decoded blocks are obtained.

Figure 10:
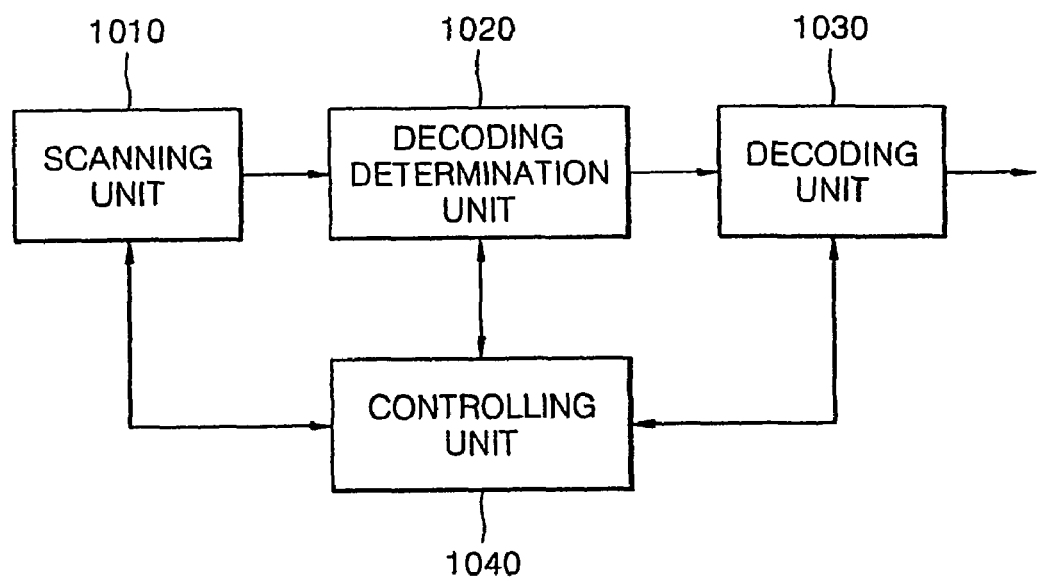
FIG. 10 is a schematic diagram of a decoder to perform decoding in the intra mode based on the multiple scanning method according to an embodiment of the present invention.

FIG. 10 is a schematic diagram of a decoder to perform decoding in the intra mode based on the multiple scanning method according to an embodiment of the present invention.

The decoder includes a scanning unit 1010, a decoding determination unit 1020, a decoding unit 1030, and a controlling unit 1040.

The scanning unit 1010 divides an input image into basic decoding units composed of predetermined sized blocks and scans at least one of the basic decoding units.

The decoding determination unit 1020 determines whether references for motion estimation of the basic decoding units scanned by the scanning unit 1010 can be used as references to decode the basic decoding units.

The decoding unit 1030 selectively decodes the input image according to the determination result of the decoding determination unit 1020, and the controlling unit 1040 controls the operations of the scanning unit 1010, the decoding determination unit 1020, and the decoding unit 1030.

Also, the controlling unit 1040 operates the scanning unit 1010, the decoding determination unit 120, and the decoding unit 1030 until decoding of the input image is completed.

Figure 11:
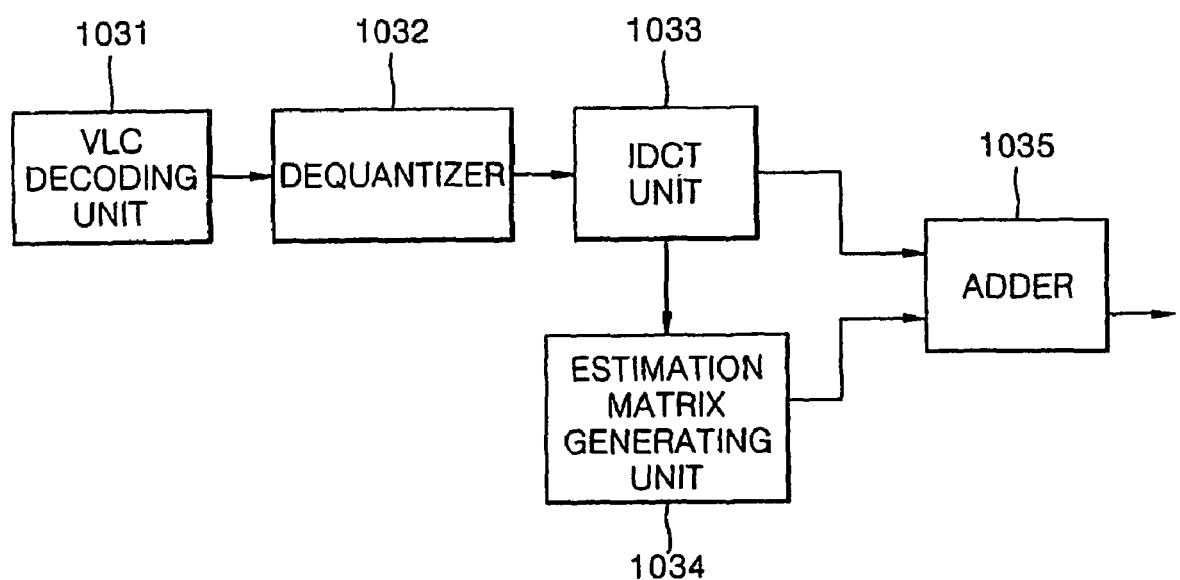
FIG. 11 is a schematic diagram of a decoding unit illustrated in FIG. 10.

FIG. 11 is a schematic diagram of the decoding unit 1030 illustrated in FIG. 10.

Referring to FIG. 11, the decoding unit 1030 includes a VLC decoding unit 1031, a dequantizer 1032, an IDCT unit 1033, an estimation matrix generating unit 1034, and an adder 1035.

The VLC decoding unit 1031 obtains the basic decoding units by VLC decoding and scanning the input image. The dequantizer 1032 dequantizes the obtained basic decoding units. The IDCT unit 1033 performs IDCT the result of dequantization to obtain references for motion estimation.

The estimation matrix generating unit 1034 obtains an estimation matrix from the reference for motion estimation. The adder 1035 adds the output from the IDCT unit 1033 and the estimation matrix to obtain decoded blocks.

Figure 12A:
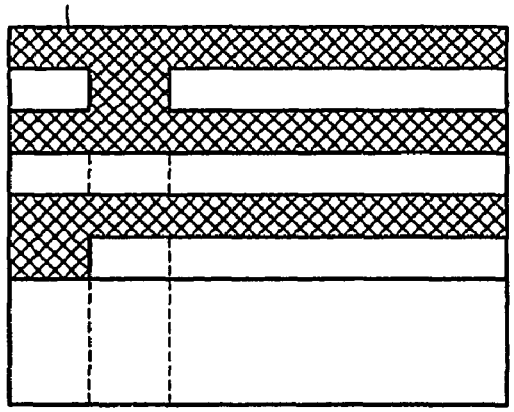
FIGS. 12A through 12C are views illustrating an encoding/decoding order in the intra mode based on the multiple scanning method according to an embodiment of the present invention.
Figure 12B:
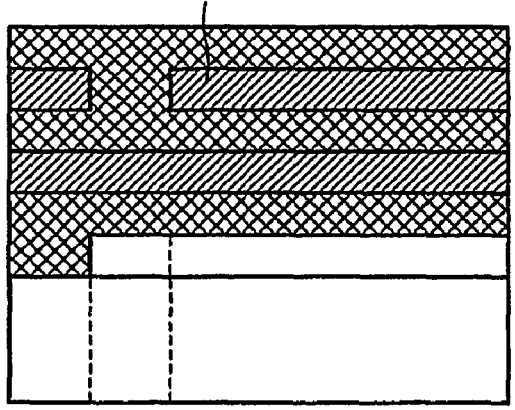
Figure 12C:
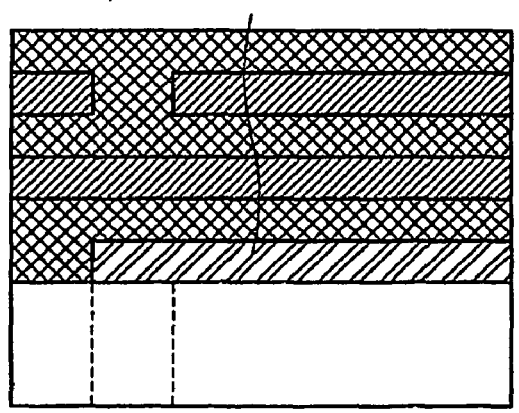

FIGS. 12A through 12C are views illustrating an encoding/decoding order in the intra mode based on the multiple scanning method according to an embodiment of the present invention.

FIG. 12 A is a view of encoded/decoded blocks at the first scan, FIG. 12B is a view of the encoded/decoded blocks at the second scan, and FIG. 12C is a view of the encoded/decoded blocks at the $n^{th}$ scan.

As described above, the present invention does not encode/decode an input image through a single scan but through multiple scans (nth scan in the present embodiment).

Such an encoding/decoding order is only an example to help illustrate the present invention, and is not limited to the example mentioned above.

Figure 13A:
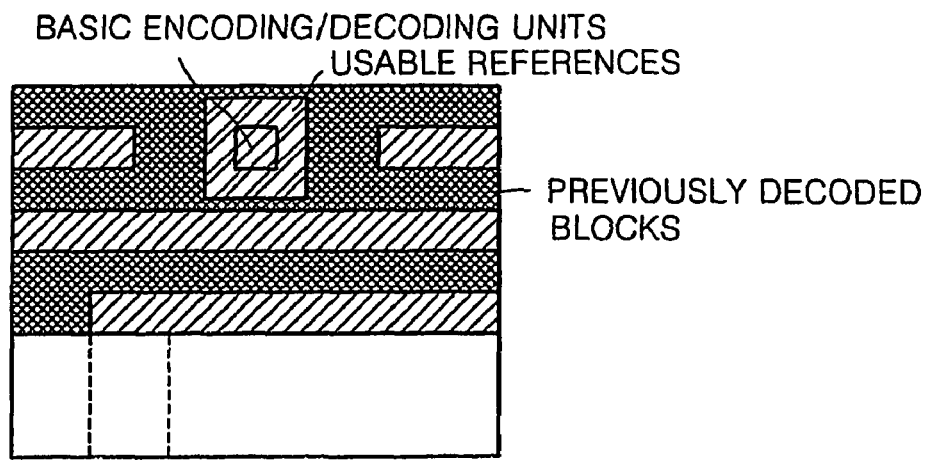
FIGS. 13A through 13C are views of possible results when performing encoding/decoding at the nth scan in the intra mode based on the multiple scanning method according to an embodiment of the present invention.
Figure 13B:
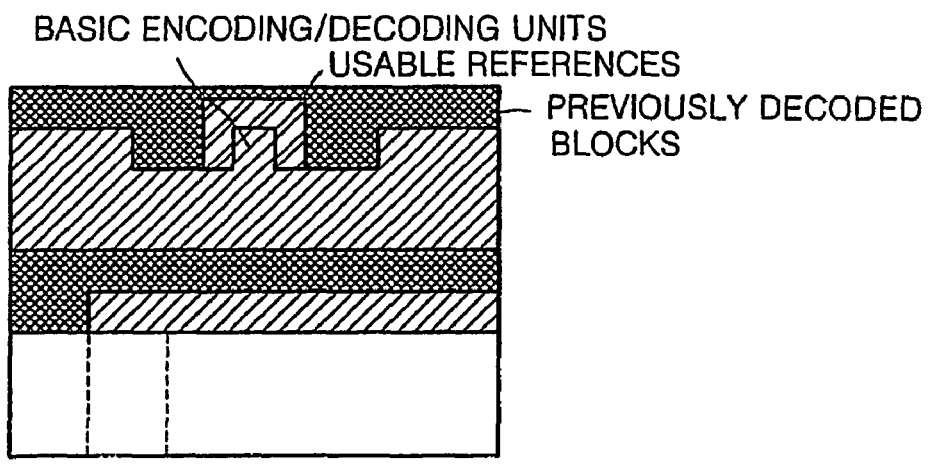
Figure 13C:
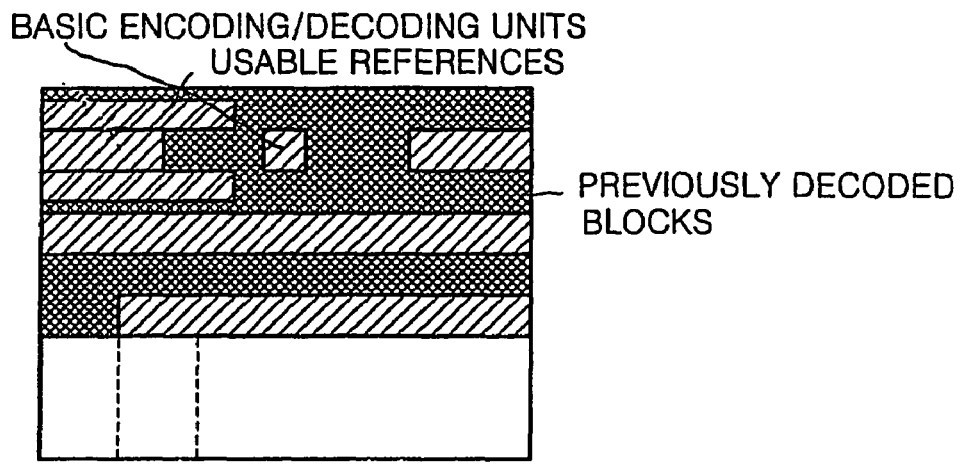

FIGS. 13A through 13C are views of possible results when performing encoding/decoding at the nth scan in the intra mode based on the multiple scanning method according to an embodiment of the present invention.

In FIG. 13A, decoded blocks before the nth scan around the basic encoding/decoding units are used as a reference for motion estimation of the basic encoding/decoding units.

In FIG. 13B, decoded blocks before the nth scan at the top, left, and right of the basic encoding/decoding units are used as a reference for motion estimation of the basic encoding/decoding units.

In FIG. 13C, decoded blocks before the nth scan at the top and bottom of the basic encoding/decoding units are used as a reference for motion estimation of the basic encoding/decoding units.

Figure 14:
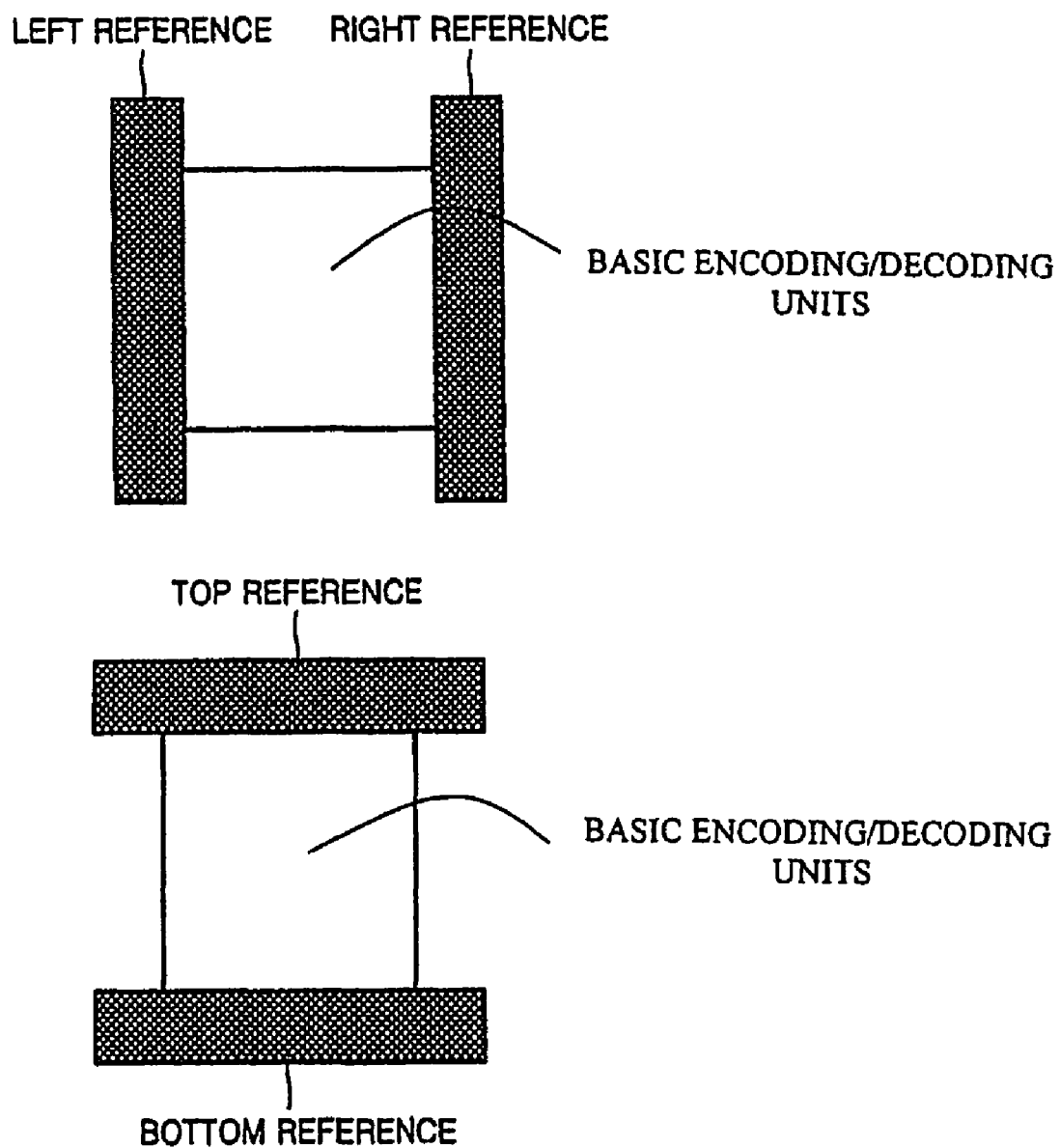
FIG. 14 is a view of a reference for motion estimation that is adoptable in the intra mode based on the multiple scanning method according to an embodiment of the present invention.

FIG. 14 is a view of a reference for motion estimation that is adoptable in the intra mode based on the multiple scanning method according to an embodiment of the present invention.

As shown in FIG. 14, the reference for motion estimation can be a combination of top, bottom, left, and/or right pixels of the basic encoding/decoding units.

In addition, the reference for motion estimation may be any M×N matrix neighboring the basic encoding/decoding units.

Figure 15:
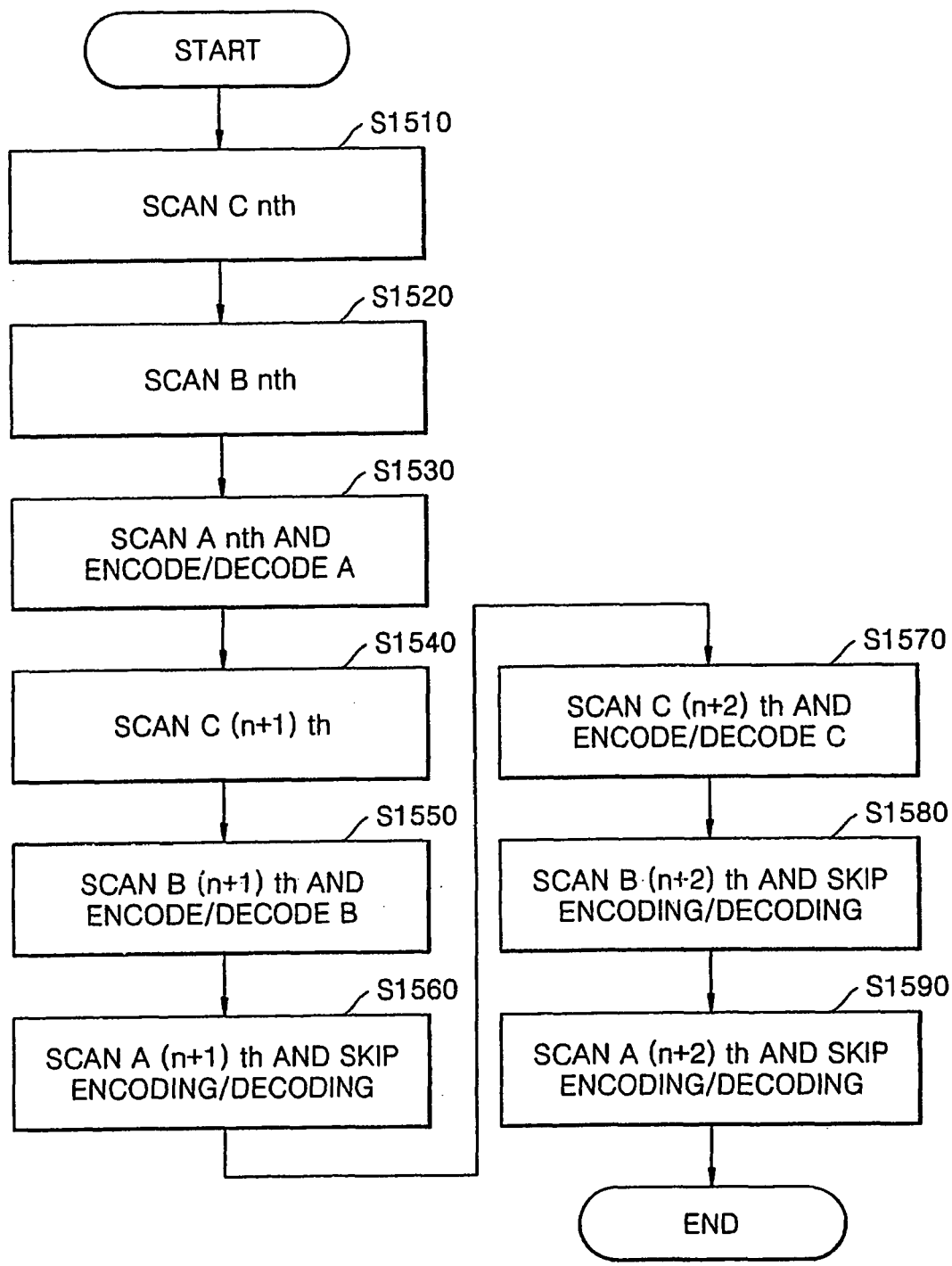
FIG. 15 is a flow chart illustrating an encoding/decoding order in an intra mode based on a multiple scanning method according to another embodiment of the present invention.

FIG. 15 is a flow chart illustrating an encoding/decoding order in an intra mode based on a multiple scanning method according to another embodiment of the present invention.

It is assumed that there are three blocks, A, B, and C, within a frame, and Block B needs information on Block A and Block C needs information on Block A and Block B. At an $n^{th}$ scan time, Block C is scanned first but it is not re-structured (1510). This is because Block A and Block B are not encoded/decoded. Block B is scanned next, but Block C still cannot be encoded/decoded (S1520). Then, Block A is the last block to be scanned, and if it is assumed that information which Block A depends on is encoded/decoded in the previous scan; Block A can be encoded/decoded (S1530).

At an $(n+1)^{th}$ scan time, although Block C is still the first block to be scanned, it cannot be re-structured since Block B is not encoded/decoded (S1540). Block B is scanned next and can be encoded/decoded at the present time because Block A is encoded/decoded (1550). Block A is scanned last and encoding/decoding is skipped since it is already encoded/decoded (S1560).

At an $(n+2)^{th}$ scan time, Block C is still the first block to be scanned and can be encoded/decoded since Block A and Block B are encoded/decoded (S1570). Block B is scanned next and encoding/decoding thereof is skipped since it is already encoded/decoded (1580). Then, A is scanned last and encoding/decoding thereof is skipped since it is already encoded/decoded (1590).

As described above, encoding and decoding efficiency of the present invention is improved since the current block can obtain information from left, left/top, top, right, or right/down blocks, etc., of the current block among previously decoded blocks because the blocks are not limitedly scanned from left to right and from top to bottom.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of encoding in an intra mode based on a multiple scanning method, the method comprising:
    dividing an input image into basic encoding units composed of predetermined sized blocks;
    scanning at least one of the basic encoding units;
    determining whether references for motion estimation of a current basic encoding unit can be used as references to encode the current basic encoding unit; and
    encoding the current basic encoding unit according to a result of the determination,
    wherein the selective encoding of the current basic encoding unit comprises:
    encoding the current basic encoding unit based on the references if the references for motion estimation can be used as the references to encode the current basic encoding unit; and
    not encoding the current basic encoding unit and moving on to the next basic encoding unit that is to be encoded if the references for motion estimation cannot be used as the references to encode the current basic encoding unit.

2. The method of claim 1, wherein from the scanning of the at least one of the basic encoding units to the encoding of the current basic encoding unit are repeated until encoding of the input image is completed.

3. The method of claim 1, wherein the encoding of the current basic encoding unit based on the references comprises:
    obtaining an estimation matrix from the references for motion estimation;
    performing a DCT (discrete cosine transform) on a difference between the current encoding unit that is to be encoded and the obtained estimation matrix;
    obtaining DCT conversion coefficients by performing dequantization; and
    encoding the current basic encoding unit using the DCT conversion coefficients.

4. The method of claim 3, wherein the DCT conversion coefficients are scanned in a zigzag pattern and encoded using a VLC (variable length coding) method.

5. The method of claim 1, wherein predetermined blocks among previously decoded blocks are used as the references for motion estimation.

6. The method of claim 5, wherein the references for motion estimation are a combination of top, bottom, left, and/or right pixels of the basic encoding units.

7. The method of claim 5, wherein the references for motion estimation are any M×N matrixes that are neighboring the basic encoding units.

8. The method of claim 1, wherein the basic encoding units composed of the predetermined sized blocks are macroblocks or M×N matrixes.

9. A computer readable recording medium having a program recorded thereon for executing the method described in claim 1.

10. A method of decoding in an intra mode based on a multiple scanning method, the method comprising:
    dividing an input image into basic decoding units composed of predetermined sized blocks;
    scanning at least one of the basic decoding units;
    determining whether references for motion estimation of a current basic decoding unit can be used as references to encode the current basic decoding unit; and
    decoding the current basic decoding unit according to a result of the determination,
    wherein the decoding of the current basic decoding unit comprises:
    decoding the current basic decoding unit based on the references if the references for motion estimation can be used as the references to decode the current basic decoding unit; and
    not decoding the current basic decoding unit and moving on to a next basic decoding unit that is not to be decoded if the references for motion estimation cannot be used as the references to decode the current basic decoding unit.

11. The method of claim 10, wherein from the scanning of the at least one of the basic decoding units to the decoding of the current basic decoding unit are repeated until decoding of the input image is completed.

12. The method of claim 10, wherein the decoding of the current basic decoding unit based on the references comprises:
    obtaining the basic decoding units through decoding and scanning the input image;

dequantizing the obtained basic decoding units;
obtaining references for motion estimation by performing IDCT (inverse DCT) on a result of the dequantization;
obtaining an estimation matrix from the obtained references for motion estimation; and
adding the result of the IDCT and the estimation matrix to obtain a decoded block.

13. The method of claim 12, wherein the basic decoding units are decoded using a VAC method and obtained using zigzag scanning in the obtaining of the basic decoding units.

14. The method of claim 10, wherein predetermined blocks among previously decoded blocks are used as the references for motion estimation.

15. The method of claim 14, wherein the references for motion estimation are a combination of top, bottom, left, and/or right pixels of the basic decoding units.

16. The method of claim 14, wherein the references for motion estimation are any M×N matrixes that are neighboring the basic decoding units.

17. The method of claim 10, wherein the basic decoding units composed of the predetermined sized blocks are macroblocks or M×N matrixes.

18. A computer readable recording medium having a program recorded thereon for executing the method described in claim 10.

19. An encoder in an intra mode based on a multiple scanning method comprising:
a scanning unit for dividing an input image into basic encoding units composed of predetermined sized blocks and scanning at least one of the basic encoding units;
an encoding determination unit for determining whether references for motion estimation of the basic encoding units scanned by the scanning unit can be used as references to encode the basic encoding units;
an encoding unit for encoding the basic encoding units according to a result of the determination of the encoding determination unit; and
a controlling unit for controlling operations of the scanning unit, the encoding determination unit, and the encoding unit,
wherein arbitrary blocks among previously decoded blocks are used as the references for motion estimation.

20. The encoder of claim 19, wherein the encoding unit comprises:
an estimation matrix generating unit to obtain an estimation matrix from the references for motion estimation;
a difference calculating unit to calculate a difference between a basic encoding unit selected by the encoding determination unit and the estimation matrix obtained from the estimation matrix generating unit;
a DCT unit to perform DCT on an output of the difference calculating unit;
a quantization unit to quantize a result output from the DCT unit; and
a VLC encoding unit to scan and perform VLC encoding on a result of quantization.

21. The encoder of claim 19, wherein the controlling unit operates the scanning unit, the encoding determination unit, and the encoding unit until encoding of the input image is completed.

22. The encoder of claim 19, wherein the references for motion estimation are a combination of top, bottom, left, and/or right pixels of the basic encoding units.

23. The decoder of claim 22, wherein the references for motion estimation are a combination of top, bottom, left, and/or right pixels of the basic decoding units.

24. The encoder of claim 19, wherein the references for motion estimation are any M×N matrixes that are neighboring the basic encoding units.

25. The encoder of claim 19, wherein the basic encoding units composed of the predetermined sized blocks are macroblocks or M×N matrixes.

26. A decoder in an intra mode based on a multiple scanning method comprising:
a scanning unit for dividing an input image into basic decoding units composed of predetermined sized blocks and scanning at least one of the basic decoding units;
a decoding determination unit for determining whether references for motion estimation of the basic decoding units scanned by the scanning unit can be used as references to decode the basic decoding units;
a decoding unit for decoding the basic decoding units according to a result of the determination of the decoding determination unit; and
a controlling unit for controlling operations of the scanning unit, the decoding determination unit, and the decoding unit,
wherein predetermined blocks among previously decoded blocks are used as the references for motion estimation.

27. The decoder of claim 26, wherein the decoding unit comprises:
a VLC decoding unit to obtain the basic decoding units through VLC decoding and scanning the input image;
a dequantinizer to dequantize the obtained basic decoding units;
an IDCT unit to perform IDCT to obtain the references for motion estimation;
an estimation matrix generating unit to obtain an estimation matrix from the references for motion estimation; and
an adder to add an output of the IDCT unit and the estimation matrix.

28. The decoder of claim 26, wherein the controlling unit operates the scanning unit, the decoding determination unit, and the decoding unit until decoding of the input image is completed.

29. The decoder of claim 26, wherein the references for motion estimation are any M×N matrixes that are neighboring the basic decoding units.

30. The decoder of claim 26, wherein the basic decoding units composed of the predetermined sized blocks are macroblocks or M×N matrixes.

* * * * *

UNITED STATES PATENT AND TRADEMARK OFFICE
CERTIFICATE OF CORRECTION

| | | |
|---|---|---|
| PATENT NO. | : 7,970,050 B2 | Page 1 of 1 |
| APPLICATION NO. | : 11/191931 | |
| DATED | : June 28, 2011 | |
| INVENTOR(S) | : Zhi-ming Zhang | |

It is certified that error appears in the above-identified patent and that said Letters Patent is hereby corrected as shown below:

Column 11, Line 9 (Approx.), In Claim 13, delete "VAC" and insert -- VLC --, therefor.

Signed and Sealed this
Fourteenth Day of February, 2012

David J. Kappos
*Director of the United States Patent and Trademark Office*